(12) United States Patent
Verbowski

(10) Patent No.: US 7,748,721 B2
(45) Date of Patent: Jul. 6, 2010

(54) SUPPLEMENTAL SUSPENSION SYSTEM AND METHOD OF USE

(76) Inventor: Larry J. Verbowski, 1875 Freeland Rd., Freeland, MI (US) 48706

( * ) Notice: Subject to any disclaimer, the term of this patent is extended or adjusted under 35 U.S.C. 154(b) by 464 days.

(21) Appl. No.: 11/690,276

(22) Filed: Mar. 23, 2007

(65) Prior Publication Data
US 2007/0241528 A1 Oct. 18, 2007

Related U.S. Application Data

(60) Provisional application No. 60/785,285, filed on Mar. 23, 2006.

(51) Int. Cl.
*B60G 17/00* (2006.01)
(52) U.S. Cl. .......... 280/5.514; 280/6.157; 280/124.101; 280/124.13; 280/124.166; 267/273; 267/277
(58) Field of Classification Search .............. 280/5.514, 280/6.157, 124.101, 124.137, 124.166, 124.167, 280/124.13; 267/273, 274, 277, DIG. 1
See application file for complete search history.

(56) References Cited

U.S. PATENT DOCUMENTS

| 2,577,761 A | | 12/1951 | Hickman | |
| 2,855,212 A | * | 10/1958 | Houser | ............... 280/6.157 |
| 2,893,750 A | | 7/1959 | Allison | |
| 2,941,815 A | * | 6/1960 | Muller | ............... 280/124.107 |
| 3,021,153 A | | 2/1962 | Dickinson | |
| 3,913,939 A | | 10/1975 | Sinclair et al | |
| 4,641,856 A | | 2/1987 | Reichenbach | |
| 4,919,441 A | | 4/1990 | Marier et al. | |
| 5,641,175 A | * | 6/1997 | Maeda et al. | ......... 280/124.137 |
| 5,927,737 A | | 7/1999 | Hoefer | |
| 6,454,284 B1 | | 9/2002 | Worman, Jr. | |
| 6,517,089 B2 | | 2/2003 | Phillis et al. | |
| 6,530,586 B2 | | 3/2003 | Fader et al. | |
| 6,722,669 B1 | | 4/2004 | Stammreich | |
| 6,733,022 B2 | | 5/2004 | Bradshaw et al. | |
| 2002/0190486 A1 | * | 12/2002 | Phillis et al. | ............. 280/6.157 |
| 2002/0190493 A1 | * | 12/2002 | Schnurpel | ............ 280/124.134 |
| 2004/0212168 A1 | * | 10/2004 | Verbowski | ........... 280/124.167 |

FOREIGN PATENT DOCUMENTS

| JP | 59-102609 A | * | 6/1984 |
| JP | 2-117409 A | * | 5/1990 |
| JP | 2-117410 A | * | 5/1990 |
| JP | 2-208116 A | * | 8/1990 |
| JP | 3-246108 A | * | 11/1991 |

* cited by examiner

*Primary Examiner*—Ruth Ilan
(74) *Attorney, Agent, or Firm*—Robert L. Stearns; Dickinson Wright, PLLC

(57) ABSTRACT

A supplemental torsion suspension system for a vehicle having primary suspension system is provided along with a method of use thereof. The supplemental system has a rotateable torsion bar and a lever arm extending from the torsion bar for engagement with a control member of the primary suspension system. An actuator is coupled to the torsion bar and is operative to impart selective rotational movement to the torsion bar and the lever arm. A corresponding application of an applied adjustment force is imparted on the member of the primary suspension system through the lever arm of the supplemental suspension system to move and/or maintain the vehicle at a desired ride height.

21 Claims, 5 Drawing Sheets

SUPPLEMENTAL SUSPENSION SYSTEM AND METHOD OF USE

CROSS-REFERENCE TO RELATED APPLICATION

This application claims the benefit of U.S. Provisional Application Ser. No. 60/785,285 filed Mar. 23, 2006, which is incorporated herein by reference in its entirety.

BACKGROUND OF THE INVENTION

1. Technical Field

This invention relates generally to vehicle suspensions, and more particularly to supplemental suspension systems to be used in combination with primary suspension systems.

2. Related Art

As shown generally in FIG. 1, vehicle chassis 10 have a primary suspension system, represented here, by way of example and without limitation, as a torsion spring suspension system 12, which can allow the ride height and ride performance of the vehicle to be adjusted. In a typical torsion spring suspension system, a pair of elongate bars, commonly referred to as torsion bars 14, have one end 16 connected to a moving component of the vehicle suspension, typically lower control arms 18, and opposite ends 17 fixedly mounted to the vehicle chassis, represented here as a laterally extending cross brace 20 spanning a pair of side frame members 22. In this arrangement, the torsion bars 14 extend longitudinally along the vehicle frame 10 between the side frame members 22. The torsion bars provide a limited amount of adjustment capability to raise and lower the ride height of the vehicle frame 10 relative to a ground surface on which the vehicle travels. An adjustment mechanism for the torsion bars 14 typically includes lever arms 24 fixed to and extending laterally from the torsion bars 14, and adjustment screws 26 mounted for engagement with the lever arms 24. The angular position of the lever arms 24 can be pivoted by rotating the respective adjustment screw 26, thereby causing the torsion bars 14 to be twisted to take on an increased or decreased torque setting. As such, the torsion bars 14 can be preset in manufacture to provide the vehicle with the desired ride height, and over time, upon the torsion bars 14 relaxing due to being under constant load, the adjustment screws 26 can be rotated to return the vehicle to its original ride height.

Unfortunately, modern vehicles, particularly heavy duty trucks, are being designed with reduced weight considerations in mind, and thus, many of the components, such as suspension springs and torsion bars are designed having reduced load capacity. To reduce their weight, commonly, their diameters and sizes are reduced. As such, when relatively heavy loads are carried in the vehicle, or when the vehicle encounters undulating terrain, such as off-road terrain, the springs and torsion bars are unable to provide good ride performance. In addition, due to their having a reduced load supporting capacity, they generally have shortened useful lives.

SUMMARY OF THE INVENTION

A supplemental torsion suspension system for a vehicle having primary suspension system including a lower control arm is provided. The supplemental system has a rotateable torsion bar and a lever arm extending radially from the torsion bar that is engageable with a member of the primary suspension system. An actuator is coupled to the torsion bar and is operative to impart selective rotational movement to the torsion bar and the lever arm, and thus, a corresponding application of an applied adjustment force to the member of the primary suspension system through the lever arm. In accordance with one presently preferred embodiment, the lever arm is arranged to communicate with a lower control arm of the primary suspension system to pivot the lower control arm to a desired ride height position.

Another aspect of the invention includes a vehicle suspension system comprising a primary suspension system in combination with a supplemental suspension system. The primary suspension system and the supplemental suspension system each impart a force on a pivotal control member of the primary suspension system to control the ride height of a vehicle relative to a ground surface. The supplemental suspension system has a rotateable torsion bar and a lever arm extending radially from the torsion bar that is engageable with the pivotal control member of the primary suspension system. An actuator is coupled to the torsion bar and is operative to impart selective rotational movement to the torsion bar and the lever arm, and thus, a corresponding application of an applied adjustment force to the pivotal control member through the lever arm.

Another aspect of the invention includes a method of increasing the load capacity of a vehicle equipped with a primary suspension system including a pivotal control member to control the ride height of the vehicle relative to a ground surface. The method includes the steps of: providing at least one supplemental torsion bar having a lever arm extending radially therefrom. Next, engaging the lever arm with the pivotal control member, and then, coupling an actuator to the torsion bar and imparting a selective rotational movement to the torsion bar and the lever arm and a corresponding application of an applied adjustment force to the pivotal control member through the lever arm.

The apparatus and method of the invention allows a primary suspension system to be readily enhanced with a supplemental suspension system, even in vehicles having minimal available space in the area of the primary suspension system. Accordingly, the load carrying capacity of the vehicle can be increased, and the life of the primary suspension system extended. In addition, the vehicle ride height can be readily adjusted via the supplemental suspension system, either while the vehicle is stationary or traveling at highway speeds. Accordingly, the ride performance of the vehicle can be changed to accommodate the terrain being traveled. Further, a supplemental suspension system constructed in accordance with the invention can be readily incorporated into a vehicle regardless of the type of its primary suspension system. As such, vehicles having primary torsion bars, leaf springs, coil-over-strut systems, by way of example and without limitation, can be readily complimented with a supplemental suspension system constructed in accordance with the invention.

BRIEF DESCRIPTION OF THE DRAWINGS

These and other objects, features and advantages will become readily apparent to those skilled in the art in view of the following detailed description of the presently preferred embodiments and best mode, appended claims, and accompanying drawings, in which:

DETAILED DESCRIPTION OF PRESENTLY PREFERRED EMBODIMENTS

Figure 2:
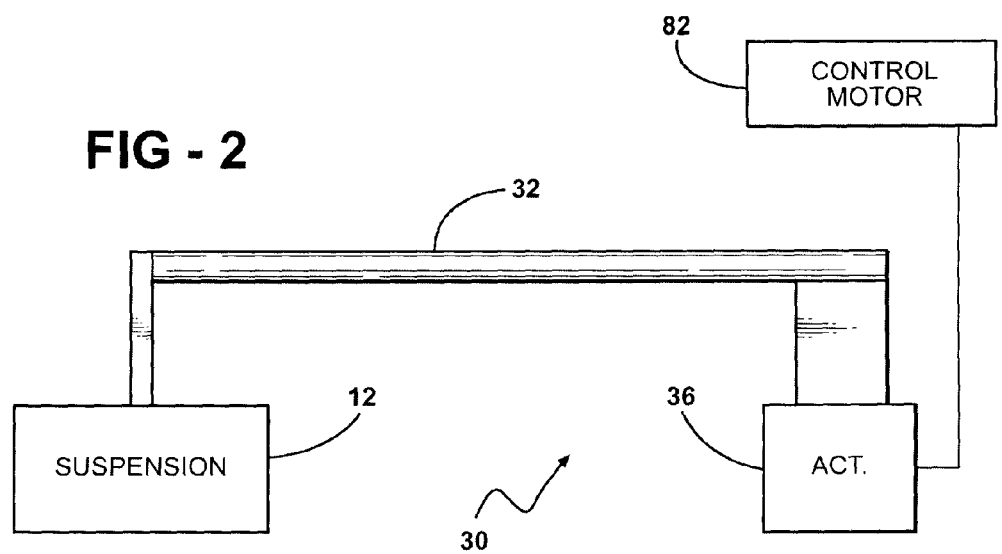
FIG. 2 is a schematic view of a supplemental suspension system in accordance with one aspect of the invention coupled to a primary suspension system of a vehicle.

Referring in more detail to the drawings, FIG. 2 illustrates schematically a supplemental torsion suspension system 30 in accordance with one aspect of the invention incorporated into a vehicle equipped with the primary suspension system 12 to supplement the primary suspension system 12 in regulating the ride height of the vehicle. The primary suspension system 12 of the vehicle can be provided as any type of suspension system, such as coil springs, leaf springs, coils-over-struts, or, by way of example and without limitations, as a torsion spring suspension system. The supplemental torsion system 30 assists the primary torsion system 12 in maintaining the vehicle at the desired ride height, and thus, relieves the primary torsion system 12 from having to support the entire load of the vehicle. As such, both the load carrying capacity of the vehicle and the useful life of the primary suspension system 12 is increased.

Figure 1:
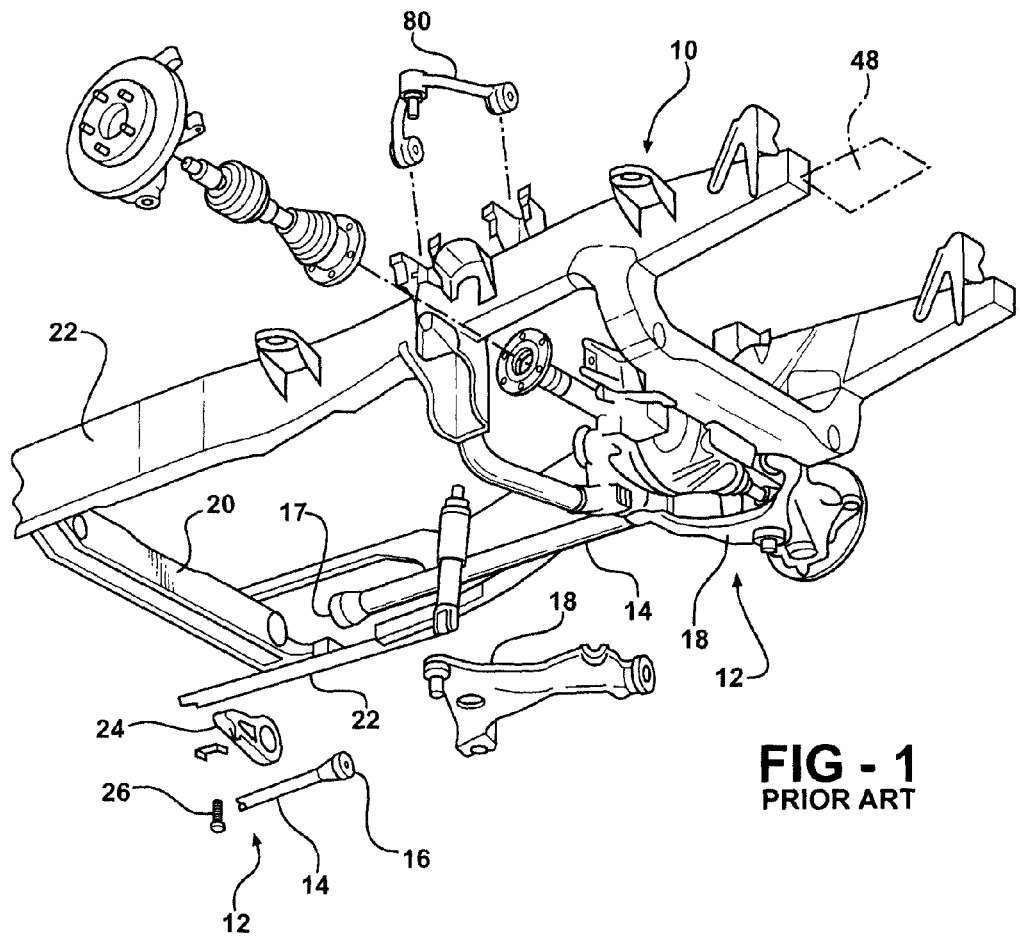
FIG. 1 is a schematic partial perspective view of a vehicle chassis and suspension constructed according to prior art.
Figure 3:
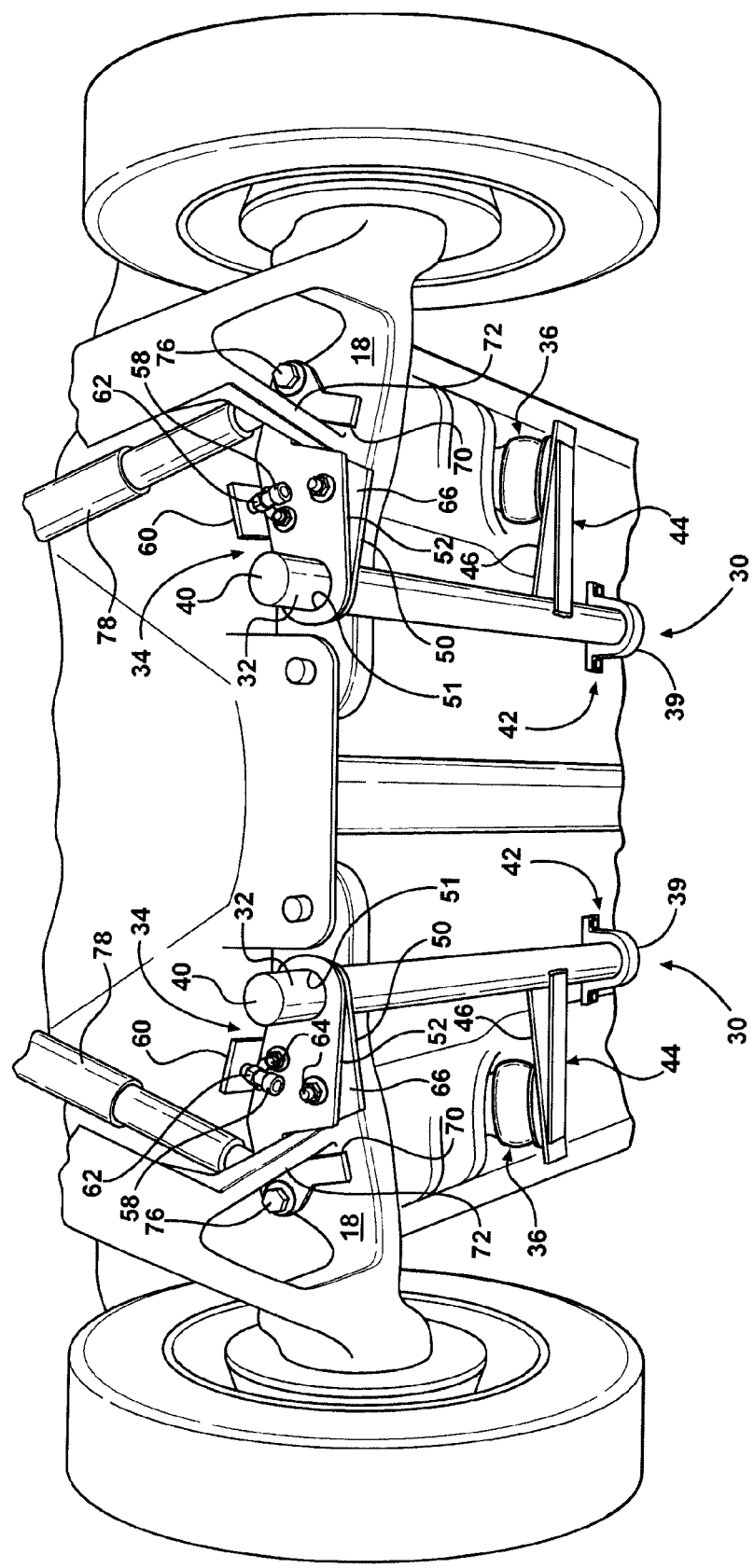
FIG. 3 is a partial perspective underside view of a vehicle having a supplemental torsion suspension system according to one presently preferred embodiment of the invention.
Figure 6:
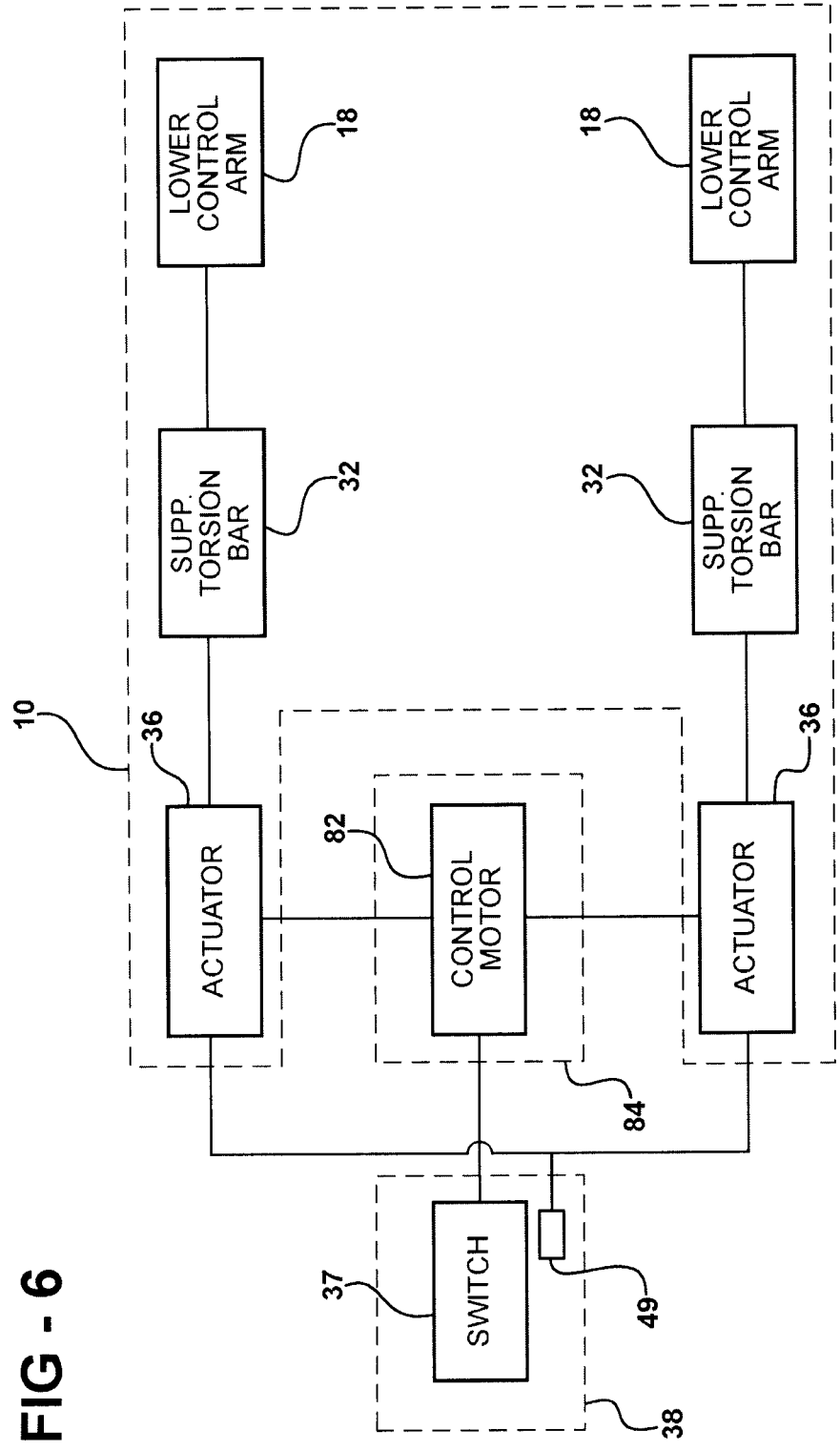
FIG. 6 is a schematic diagram of a supplemental suspension system according to one presently preferred embodiment of the invention incorporated into a vehicle in operable communication with a primary suspension system of the vehicle.

In FIG. 3, a vehicle outfitted with a supplemental suspension system 30 constructed in accordance with one presently preferred embodiment of the invention is illustrated, wherein the primary suspension system 12 of the vehicle is a torsion suspension system 12, as shown in FIG. 1, for example. The supplemental torsion suspension system, referred to hereafter for convenience as supplemental system 30, has at least one, and shown here as a pair of rotateable supplemental torsion bars 32 with lever arms 34 extending laterally from the supplemental torsion bars 32. The lever arms 34 are engageable with a control member of the primary suspension system 12, represented here, by way of example and without limitation, as the pivotal lower control arms 18 of the primary suspension system 12. An actuator 36 is coupled to each supplemental torsion bar 32 and is operative to impart selective rotational movement to the torsion bars 32 and the lever arms 34. As such, a corresponding application of an applied adjustment force is applied to the lower control arms 18 through the lever arms 34. In addition, the actuators 36 are preferably readily adjustable, preferably from within a vehicle passenger compartment 38 (FIG. 6). In one presently preferred arrangement, a controller or actuation switch 37 within the vehicle compartment 38, for example, is arranged in operable communication with the actuators 36 so that the ride height of the vehicle can be readily adjusted through manipulation of the actuation switch 37, whether the vehicle is stationary or traveling at normal driving speeds.

The supplemental torsion bars 32 are constructed from any suitable material as an elongate member capable of withstanding the torque that will be placed on it in use, and can be a solid bar, or of a tubular construction. One material chosen may be spring steel, for example, of any suitable length, depending on the configuration and specifications of the vehicle chassis 10. It should be recognized that some configurations may be longer than others, and in some cases, depending on whether the supplemental torsion bars 32 extend the length of the vehicle, or if they extend transversely or oblique to the length of the vehicle. The material chosen can be provided having any suitable diameter to best support the anticipated load carrying demands on the vehicle suspension system. As is known, the diameter of a torsion bar has the greatest impact on the spring rate of the torsion bar, all other factors remaining constant, and so small increases or decreases in diameter can have a large impact on the ability of the suspension system to support loads. For example, if the diameter of a torsion bar is doubled, the spring rate of the torsion bar is increased by a factor of 16 times. Accordingly, the addition of the supplemental suspension system 30, even with relatively small diameter supplemental torsion bars 32, can greatly increase the load carrying capacity of the primary suspension system 12.

The supplemental torsion bars 32 are generally cylindrical and extend along longitudinal axes between opposite ends 39, 40. One of the ends 39 is shown being supported for rotation, by way of example and without limitations, by journal bearings 42 (FIGS. 3 and 4), while the opposite ends 40 are arranged in generally fixed, operable communication with the lower control arms 18 via the lever arms 34. It should be recognized that the support bearings could be provided as any suitable type of bearing, including rolling element bearings, if desired, and that they can be attached or housed by the frame 10 in any suitable manner.

Figure 4:
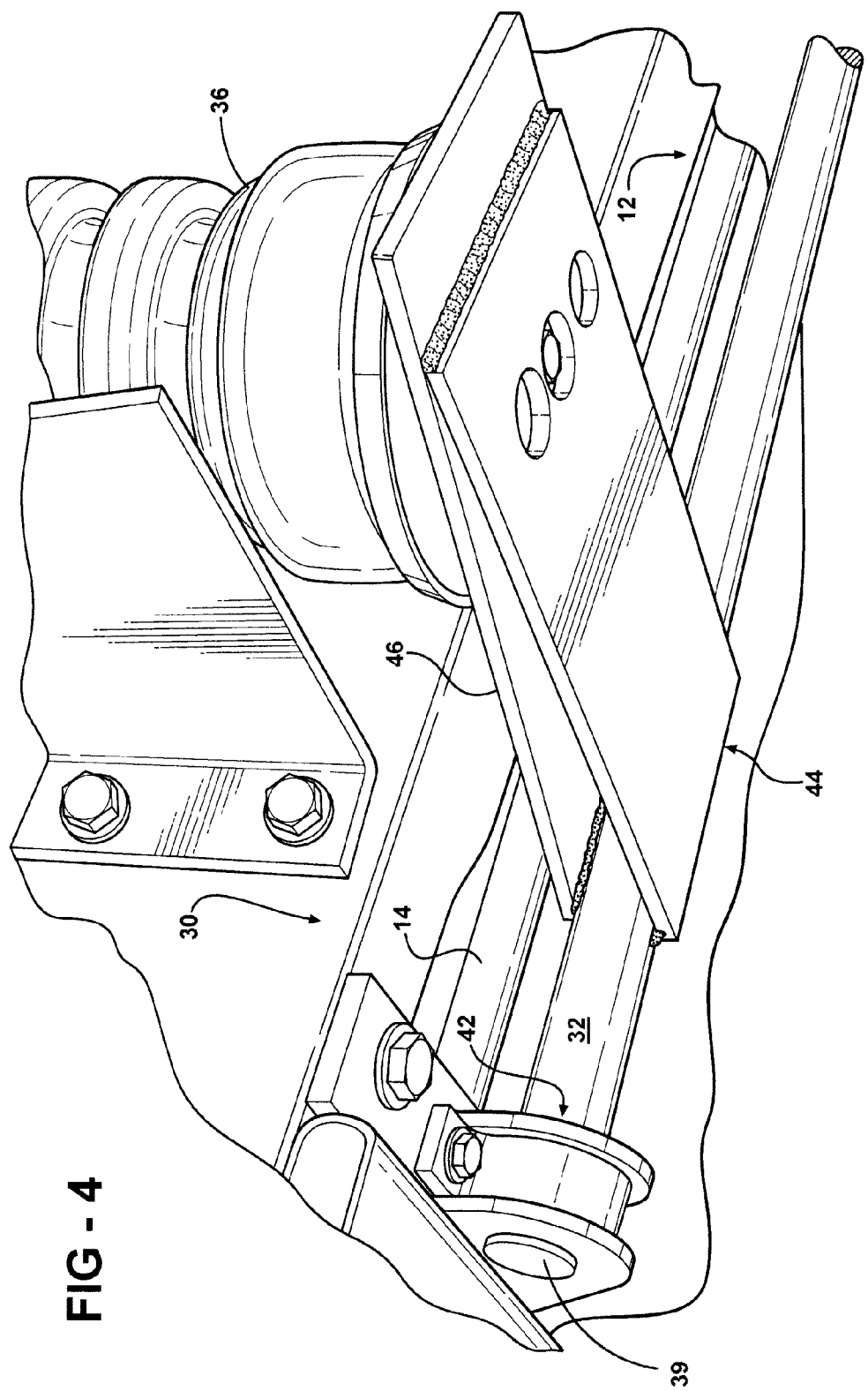
FIG. 4 is a close-up perspective view of an actuator shown arranged in operable communication with a torsion bar of the supplemental torsion suspension system of FIG. 3.

As shown in FIGS. 3 and 4, the supplemental torsion system 30 is represented, by way of example and without limitations, as having actuator support members 44 extending radially from the supplemental torsion bars 32. The support members 44 are shown here, for example, as being fixed, such as via a weld joint or some other suitable attachment mechanism, to the supplemental torsion bars 32 generally adjacent the ends 39 supported for rotation. As best shown in FIG. 4, the support members 44 have an upper platform 46 sized for engagement with the respective actuator 36, represented here, by way of example and without limitations, as pneumatic or air bag actuators. It should be recognized that depending on the arrangement of the supplemental suspension system 30, that other types of actuators could be incorporated to impart the rotation force on the supplemental torsion bars 32, including coil springs, coil springs over shock absorbers, urethane bumpers, gas filled cylinders, linear ballscrew actuators, torsion actuators, or any other type of load supporting device, for example. Regardless of the type of actuator chosen, the range of movement of the selected actuator preferably provides the vehicle with sufficient ride height variation to best meet the anticipated driving demands of the vehicle. For example, the actuators 36 could be provided having a vertical travel range of between about 2-10 inches, or more. In addition, although the actuators 36 are shown imparting a rotating force on the supplemental torsion bars 32 via the laterally extending support members 44, it should be recognized that actuators could impart rotating forces on the supplemental torsion bars 32 in other ways, such as by being attached coaxially with the supplemental torsion bars 32, for example.

When incorporating the supplemental suspension system 30 into the vehicle, the upper platforms 46 can be oriented generally parallel to a plane 48 (FIG. 1) of the vehicle frame 10 while the vehicle is midway between its lower and upper limits of ride height travel. When in this position, the actuators 36 are also preferably in their mid-range position of operable travel. Accordingly, the supplemental suspension system 30 is preferably able to move the chassis 10 over generally equal distances upwardly and downwardly from the set-up position. To facilitate being able to determine the vehicle drive height, vertical position sensors 49 (FIG. 6) could be incorporated to provide a driver with accurate real-time information regarding the vehicle drive height. The position sensors could be correlated with the position and/or pressure within the actuators 36, or otherwise, if desired. It should be recognized that the desired set-up parameters of the supplemental suspension system 30 can be altered, depending on user preferences. It should also be recognized that depending on the type of actuators 36 selected, that they may be variable to alter the vehicle drive height, or fixed, if desired.

Figure 5:
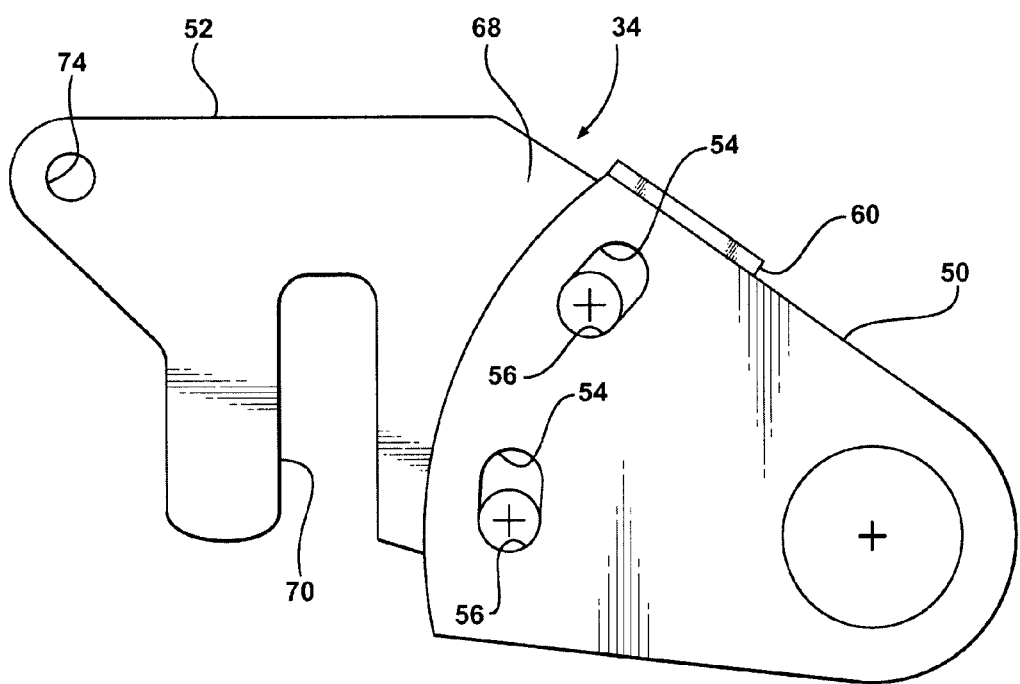
FIG. 5 is a schematic plan view of a lever arm assembly constructed according to one presently preferred embodiment.

As best shown in FIGS. 3 and 5, the lever arms 34 are represented here, by way of example and without limitations, as having a pair of abutting plates 50, 52 extending radially from the supplemental torsion bars 32. One of the plates 50 is fixed relative to the respective supplemental torsion bar 32, such as via a weld joint, for example, while the other plate 52 preferably has a clearance opening 51 for rotateable receipt of the supplemental torsion bar 32. As such, the plates 50, 52 are preferably adjustable relative to one another, which is facilitated by at least one of the plates 50 having arcuate slots 54 (FIG. 5) arranged to register with through openings 56 in the other of the plates 50. To facilitate moving the abutting plates 50, 52 pivotally relative to one another, preferably an adjustment mechanism, represented here, for example, as a threaded bolt 58 and flange 60 are arranged for engagement with one another. The bolt 58 is received in threaded engagement through a fixed boss 62 extending laterally from one of the plates 52, while the flange 60 extends laterally from the other plate 50 for engagement with an end of the bolt 58. As such, rotation of the bolt 58 facilitates pivotal movement of the plates 50, 52 relative to one another. Upon being located in their desired positions, one or more fasteners, such as standard bolts 64, for example, can be used to secure the abutting plates 50, 52 against relative movement when in their desired positions. To further secure the plates against relative movement, abutting faces of the plates 66, 68 could be knurled or otherwise textured to create increased friction in shear between the abutting textured surfaces 66, 68.

As mentioned, the lever arms 34 in the illustrated embodiment are constructed for operable attachment to the lower control arms 18. At least one of the plates 52 has a receptacle or slot 70 for receipt of a portion of the respective lower control arm 18, wherein the lower control arms 18 are represented here, for example, as having cross bars 72 received in the slots 70. With the cross bars 72 at least partially received in the slots 70, the respective plates 50, 52 can be adjusted or moved relative to one another by rotating the bolts 58 to fully engage the lower control arms 18 in the slots 70. Upon locating the lower control arms 18 in the slots 70, the bolts 64 can be tightened to selectively fix the plates 50, 52 against relative movement, and to secure the lever arms 34 to the lower control arms 18. As shown in FIG. 5, to further secure the lever arms 34 against unwanted movement relative to the lower control arms 18, through openings 74 can be formed in one of the plates 52, such that additional fasteners 76 (FIG. 3) can be disposed through the openings 72 for attachment to the respective lower control arm 18. The fasteners 76 are represented here, for example, as also being secured to shock absorbers 78 extending between the lower control arms 18 and associated upper control arms 80 (FIG. 1). It should be recognized that the lever arms 34 could be constructed having any suitable cross-sectional shape and overall geometry as necessary, and that they could be constructed as solid bars, pipes, or linkage system, for example, for operable attachment to any lower control arm configuration, and that the embodiment shown is but one example for attachment to a specific lower control arm configuration.

As represented diagrammatically in FIG. 6, the actuators 36 are preferably actuateable simultaneously via the switch 37 in response to actuation of a controller or control motor, such as an air compressor 82, for example, wherein the actuators 36 are pneumatic actuators. The control motor 82 can be mounted anywhere on the vehicle, such as in an engine compartment 84. Many vehicles are stocked with an air compressor for actuation of other pneumatic devices, such as automatically adjustable airbag-type suspensions incorporated in the primary suspension system 12, for example. As such, these vehicles may not require a separate control motor 82 to be incorporated into the vehicle to actuate the supplemental suspension system 30. It should be recognized that the control motor 82 is desirably equipped with suitable valves to direct an equalized pressurized gas or airflow to the respective actuators 36. Accordingly, the supplemental torsion bars 32 are assured of being rotated uniformly with one another and being placed under equal torque relative to one another, thereby assuring the vehicle is maintained in a level orientation relative to the ground surface. With the control motor 82 being actuateable via the switch 37 from within the vehicle passenger compartment, the vehicle ride height and performance can be adjusted while the vehicle is being driven. This could be of great value, particularly if the vehicle is being driven in a race requiring varying ride heights and performance.

Another aspect of the invention includes a method of increasing the load capacity of a vehicle equipped with a primary suspension system 12. The method includes providing the pair of supplemental torsion bars 32 with the lever arms 34 extending radially therefrom. Next, engaging the lever arms 34 with the pivotal control member, for example, the lower control arms 18, and then, coupling the actuators 36 to the supplemental torsion bars 32 and imparting a selective rotational movement to the supplemental torsion bars 32 and the lever arms 34 and a corresponding application of an applied adjustment force to the lower control arms 18 through the lever arms 34. Accordingly, in a vehicle having a primary torsion suspension system 12, such as primary torsion bars 14, for example, the vehicle having been retrofitted with the supplemental suspension system 30 will have a total of four torsion bars, with a pair of torsion bars acting directly on the separate lower control arms.

It is to be understood that other embodiments of the invention which accomplish the same function are incorporated herein within the scope of any ultimately allowed patent claims.

What is claimed is:

1. A supplemental torsion suspension system for a vehicle equipped with a primary suspension system, comprising:
   a rotatable torsion bar;
   a lever arm extending outwardly from said torsion bar, said lever arm arranged to engage a control member of the vehicle primary suspension system;
   an actuator coupled to said torsion bar, said actuator being operable to impart a selected rotational movement to said torsion bar and said lever arm and a corresponding application of an applied adjustment force to the control member through said lever arm; and
   said lever arm having a pair of abutting plates rotateable relative to one another.

2. The supplemental torsion system of claim 1 further comprising a controller in operable communication with said actuator, said controller being arranged to send a signal to move said actuator.

3. The supplemental torsion system of claim 1 wherein said actuator is pneumatic.

4. The supplemental torsion system of claim 1 wherein one of said plates is fixed to said torsion bar.

5. A vehicle suspension system comprising a primary suspension system in combination with a supplemental suspension system, said primary suspension system and said supplemental suspension system each imparting a force on a pivotal control member of the primary suspension system to control the ride height of a vehicle relative to a ground surface, said supplemental suspension system, comprising:
   a rotatable torsion bar;
   a lever arm extending radially from said torsion bar and being engaged with the pivotal control member and being attached directly to the primary suspension system; and
   an actuator coupled to said torsion bar and operative to impart a selective rotational movement to said torsion bar and said lever arm and corresponding application of an applied adjustment force to the control member through said lever arm.

6. The supplemental torsion system of claim 1 further comprising a pair of said torsion bars and a pair of said actuators coupled to separate ones of said torsion bars.

7. The supplemental torsion system of claim 6 further comprising a controller in operable communication with said actuators, said controller being arranged to send a signal to actuate said actuators and rotate said torsion bars uniformly with one another.

8. A supplemental torsion suspension system for a vehicle equipped with a primary suspension system, comprising:
   a rotatable torsion bar;
   a lever arm extending outwardly from said torsion bar, said lever arm arranged to engage a control member of the vehicle primary suspension system and being attached directly to the primary suspension system;
   an actuator coupled to said torsion bar, said actuator being operable to impart a selected rotational movement to said torsion bar and said lever arm and a corresponding application of an applied adjustment force to the control member through said lever arm; and
   a bearing supporting said torsion bar adjacent one end with said lever arm extending from said torsion bar adjacent an opposite end, said lever arm being the sole support for said torsion bar adjacent said opposite end.

9. A supplemental torsion suspension system for a vehicle equipped with a primary suspension system, comprising:
   a rotatable torsion bar;
   a lever arm extending outwardly from said torsion bar, said lever arm arranged to engage a control member of the vehicle primary suspension system; and
   an actuator coupled to said torsion bar, said actuator being operable to impart a selected rotational movement to said torsion bar and said lever arm and a corresponding application of an applied adjustment force to the control member through said lever arm, wherein the control member is a pivotal lower control arm and said lever arm has a slot for attachment to the lower control arm.

10. The vehicle suspension system of claim 5 wherein said primary suspension is selected from the group consisting of: coil springs, leaf springs, coils-over-struts, and torsion bars.

11. The vehicle suspension system of claim 5 further comprising a pair of said torsion bars and a pair of said actuators coupled to separate ones of said torsion bars.

12. The vehicle suspension system of claim 11 further comprising a controller in operable communication with said actuators, said controller being arranged to send a signal to actuate said actuators and rotate said torsion bars uniformly with one another to apply an equal force on said torsion bars.

13. The vehicle suspension system of claim 12 wherein said actuators are pneumatic and further comprising a valve in operable communication with said actuators and said controller, said valve directing a specified application of force through said actuators.

14. The vehicle suspension system of claim 13 wherein said valve directs an equalized application of force to through said actuators.

15. The vehicle suspension system of claim 5 further comprising a bearing supporting said torsion bar adjacent one end of said torsion bar.

16. A method of increasing the load capacity of a vehicle equipped with a primary suspension system as originally manufactured including a pair of lower control arms pivotal to control the ride height of the vehicle relative to a ground surface, the method comprising the steps of:
   providing a pair of rotatable torsion bars with a lever arm extending therefrom, each lever arm having a pair of abutting plates adjustable relative to one another;
   engaging the lower control arms with the lever;
   adjusting the abutting plates rotateably with one another and then fixing the plates against relative movement with one another; and
   coupling an actuator to each of the torsion bars and imparting a selective rotational movement to the torsion bars and the lever arms and applying a corresponding adjustment force to the lower control arms through the lever arms.

17. The method of claim 16 further including supporting said torsion bar adjacent one of its ends with a bearing.

18. The method of claim 16 further including providing said actuator as a pneumatic actuator.

19. The method of claim 16 further including arranging a controller in operable communication with said actuators and selectively controlling the movement of said actuators with said controller.

20. The method of claim 19 further comprising providing said actuators as pneumatic actuators and arranging a valve in operable communication with said controller and said actuators, said valve regulating a selected pressure of gas supplied to said actuators.

21. The method of claim 20 further comprising arranging said valve to regulate an equalized pressure of gas to said actuators.

* * * * *